(12) United States Patent
Chen et al.

(10) Patent No.: US 10,814,731 B2
(45) Date of Patent: Oct. 27, 2020

(54) SYSTEM AND METHOD FOR SUPPRESSING THE SERPENTINE INSTABILITY OF RAILWAY VEHICLE

(71) Applicant: CRRC Qingdao Sifang Co., Ltd., Shandong (CN)

(72) Inventors: Shuangxi Chen, Shandong (CN); Dalian Yu, Shandong (CN); Xiaojun Deng, Shandong (CN); Shaoqing Liu, Shandong (CN); Haitao Li, Shandong (CN); Wenqiang Qu, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 244 days.

(21) Appl. No.: 16/081,118

(22) PCT Filed: Mar. 22, 2017

(86) PCT No.: PCT/CN2017/077638
§ 371 (c)(1),
(2) Date: Aug. 30, 2018

(87) PCT Pub. No.: WO2017/167087
PCT Pub. Date: Oct. 5, 2017

(65) Prior Publication Data
US 2019/0070976 A1     Mar. 7, 2019

(30) Foreign Application Priority Data
Mar. 30, 2016   (CN) .......................... 2016 1 0191795

(51) Int. Cl.
*B60L 15/20*   (2006.01)
*B60W 20/15*   (2016.01)
*B60W 10/08*   (2006.01)

(52) U.S. Cl.
CPC ............ *B60L 15/20* (2013.01); *B60W 10/08* (2013.01); *B60W 20/15* (2016.01);
(Continued)

(58) Field of Classification Search
CPC ................ B60L 15/20; B60L 2200/26; B60L 2240/421; B60L 2240/423;
(Continued)

(56) References Cited

U.S. PATENT DOCUMENTS 3,705,516 A * 12/1972 Reis ........................ G01H 1/003
73/659
4,067,261 A *  1/1978 Scheffel .................... B61F 3/02
105/157.1
(Continued)

FOREIGN PATENT DOCUMENTS

CN    201214427 Y  *  4/2009 .............. H02K 1/14
CN    102350996 A       2/2012
(Continued)

OTHER PUBLICATIONS

International Search Report (PCT/ISA/210) dated Jun. 22, 2017, by the Chinese Patent Office as the International Searching Authority for International Application No. PCT/CN2017/077638.

*Primary Examiner* — Behrang Badii
*Assistant Examiner* — Jalal C Coduroglu
(74) *Attorney, Agent, or Firm* — Buchanan Ingersoll & Rooney PC

(57) ABSTRACT

A system and method for suppressing serpentine instability of a railway vehicle, comprising a serpentine warning and control module for determining whether a bogie is in a state of serpentine instability; a traction motor speed control system for controlling a rotation speed of a traction motor according to a determination from the serpentine warning and control module; a signal output end of the serpentine
(Continued)

warning and control module is connected with the traction motor speed control system. In the present disclosure, it extracts the serpentine characteristic wave from the transverse acceleration of the bogie and calculates the vibration non-linear index according to the extracted serpentine non-linear characteristic to judge whether the bogie is in a state of serpentine instability, and controls a direct torque of the traction system through the DTC control module.

10 Claims, 2 Drawing Sheets

(52) U.S. Cl.
CPC ..... *B60L 2200/26* (2013.01); *B60L 2240/421* (2013.01); *B60L 2240/423* (2013.01); *Y02T 10/7275* (2013.01)

(58) Field of Classification Search
CPC .......... B60L 2240/427; B60L 2240/12; B60L 2240/18; B60L 2240/429; B60L 2240/622; B60L 2250/16; B60L 2260/44; B60W 20/15; B60W 10/08; Y02T 10/7275; H02P 21/30; B61L 25/025; B61L 15/0081; B61L 2205/04; G01M 17/08

See application file for complete search history.

(56) References Cited

U.S. PATENT DOCUMENTS

| | | | | |
|---|---|---|---|---|
| 4,067,262 A * | 1/1978 | Scheffel | ............... | B61F 3/02 105/168 |
| 4,150,324 A * | 4/1979 | Naito | ............... | H02P 7/29 318/139 |
| 4,493,042 A * | 1/1985 | Shima | ............... | G01H 1/003 702/35 |
| 4,711,320 A * | 12/1987 | Dombroski | ............... | B61K 3/00 184/3.2 |
| 4,897,597 A * | 1/1990 | Whitener | ............... | G01N 27/048 324/693 |
| 5,382,207 A * | 1/1995 | Skowronski | ....... | A63B 22/0023 198/807 |
| 5,484,362 A * | 1/1996 | Skowronski | ....... | A63B 22/0023 482/51 |
| 5,499,273 A * | 3/1996 | Kull | ............... | H04L 7/007 375/326 |
| 6,095,951 A * | 8/2000 | Skowronski | ....... | A63B 22/0023 482/51 |
| 6,148,784 A * | 11/2000 | Masberg | ............... | B60K 6/26 123/192.1 |
| 6,158,405 A * | 12/2000 | Masberg | ............... | B60K 6/26 123/192.1 |
| 7,089,099 B2 * | 8/2006 | Shostak | ............... | B60C 23/005 701/29.6 |
| 7,103,460 B1 * | 9/2006 | Breed | ............... | B60C 23/0408 701/29.1 |
| 7,421,321 B2 * | 9/2008 | Breed | ............... | B60C 11/24 340/442 |
| 7,705,743 B2 * | 4/2010 | Barone | ............... | B61L 15/0027 340/682 |
| 8,428,362 B2 * | 4/2013 | Miyajima | ............... | G01C 21/3602 382/190 |
| 8,922,093 B2 * | 12/2014 | Crocker | ............... | H02K 1/14 310/114 |
| 9,602,199 B2 * | 3/2017 | Yang | ............... | H04B 10/07951 |
| 9,789,881 B2 * | 10/2017 | Nappo | ............... | B60L 15/025 |
| 2005/0192727 A1 * | 9/2005 | Shostak | ............... | B60C 23/041 701/37 |
| 2005/0273218 A1 * | 12/2005 | Breed | ............... | B60R 21/20 701/2 |
| 2011/0298424 A1 * | 12/2011 | Yamauchi | ............... | H01M 10/482 320/118 |
| 2013/0270936 A1 * | 10/2013 | Mayor | ............... | H02K 9/19 310/54 |
| 2014/0113828 A1 * | 4/2014 | Gilbert | ............... | H01B 1/00 505/100 |
| 2014/0159318 A1 * | 6/2014 | Lattime | ............... | F16J 15/447 277/412 |
| 2016/0332648 A1 * | 11/2016 | Yu | ............... | B61L 27/0027 |
| 2017/0309093 A1 * | 10/2017 | Feng | ............... | B60W 50/02 |
| 2019/0070976 A1 * | 3/2019 | Chen | ............... | B61L 15/0081 |

FOREIGN PATENT DOCUMENTS

| | | | | |
|---|---|---|---|---|
| CN | 102706569 A | | 10/2012 | |
| CN | 103010226 A | * | 4/2013 | ............... B61H 5/00 |
| CN | 102350996 B | * | 5/2013 | ............... B61H 5/00 |
| CN | 103625494 A | * | 3/2014 | ............... B61H 5/00 |
| CN | 103712806 A | | 4/2014 | |
| CN | 103802852 A | * | 5/2014 | ........... B60L 15/025 |
| CN | 103900835 A | | 7/2014 | |
| CN | 203996235 U | * | 12/2014 | ............... B60L 9/16 |
| CN | 104442913 A | * | 3/2015 | ............... B60L 9/16 |
| CN | 104627196 A | * | 5/2015 | ............... B60L 9/16 |
| CN | 204368173 U | * | 6/2015 | ............... H02K 1/14 |
| CN | 102582645 B | * | 7/2015 | ............... B60L 9/16 |
| CN | 104802820 A | * | 7/2015 | ............... B61F 5/24 |
| CN | 104949848 A | | 9/2015 | |
| CN | 204605834 U | * | 9/2015 | ............... B60L 9/16 |
| CN | 204605835 U | * | 9/2015 | ............... B61F 5/24 |
| CN | 105083251 A | | 11/2015 | |
| CN | 105225421 A | * | 1/2016 | ............... B61F 5/24 |
| CN | 105313913 A | * | 2/2016 | ............... B60L 9/16 |
| CN | 105372080 A | * | 3/2016 | ............... B61F 5/24 |
| CN | 105711444 A | * | 6/2016 | ............. H02P 21/30 |
| CN | 105711444 A | | 6/2016 | |
| CN | 205553955 U | * | 9/2016 | ............... B61F 5/24 |
| CN | 205553955 U | | 9/2016 | |
| WO | WO-2012135991 A1 | * | 10/2012 | ............... B61H 5/00 |
| WO | WO-2014139771 A2 | * | 9/2014 | ............... B60L 9/16 |

* cited by examiner

SYSTEM AND METHOD FOR SUPPRESSING THE SERPENTINE INSTABILITY OF RAILWAY VEHICLE

TECHNICAL FIELD

The present disclosure relates to the field of a system and method for suppressing, especially relates to a system and method for suppressing the serpentine instability of a railway vehicle.

BACKGROUND

Train safety is a primary consideration for train operation. Therefore, domestic and foreign manufacturers have designed different monitor systems and devices to monitor the operation status of trains. These monitor systems and devices widely use accelerometers and strain gauge meters to monitor critical parts, which monitor train safety index and stability index. However, at present, there is no national standard for judging serpentine instability of a train. Usually, this processing method is adopted: a 0.5-10 Hz band-pass filtering for a transverse vibration acceleration of a bogie of a train is carried out, if the filtered signal has six consecutive wave peaks greater than 8-10 m/s$^2$, then the train is considered to be unstable transversely (serpentine instability). However, the filtering range of this method is relatively large. After filtering, there can be signals outside the serpentine wave. Moreover, no theoretical basis is available for the definition of six continuous wave peaks, and misjudgments on the serpentine instability may occur.

With the increase of train speed, requirements for transportation safety are getting higher and higher. It is especially important to give warning and control to the serpentine instability of the train. Therefore, using detection technology to monitor the running status of high-speed rail train in real time, and providing a new method for accurate early warning of possible serpentine instability, is of great significance.

SUMMARY

The main purpose of the present disclosure is to solve a technical problem of how to eliminate a serpentine instability after the serpentine instability happens, and to provide a system for suppressing the serpentine instability by controlling a torque of a traction system.

The present disclosure also provides a method for suppressing the serpentine instability by controlling the torque of the traction system.

To achieve the above purpose, the technical solution of the present disclosure is:

a system for suppressing serpentine instability of a railway vehicle, comprising a serpentine warning and control module for determining whether a bogie is in a state of serpentine instability;

a traction motor speed control system for controlling a rotation speed of a traction motor according to a determination from the serpentine warning and control module;

wherein, a signal output end of the serpentine warning and control module is connected with the traction motor speed control system.

Further, a transverse acceleration measure module for measuring the transverse vibration acceleration of the bogie is comprised;

a signal output end of the transverse acceleration measure module is connected with a signal input end of the serpentine warning and control module;

the serpentine warning and control module determines whether the bogie is in a state of serpentine instability based on the data transmitted by the transverse acceleration measure module.

Further, the traction motor speed control system comprises a given speed control module for selecting and transmitting an original given rotation speed sp1 or an adjusted given rotation speed sp2 to a speed control device module according to the control signal k and the adjusted given rotation speed sp2 transmitted by the serpentine warning and control module;

a speed control device module for receiving a given rotation speed and a actual rotation speed and transmitting a given flux linkage Flux* and a given torque Torque* to a DTC control module;

the DTC control module for receiving a current I_ab and a voltage V_abc transmitted by a traction motor measure module and a given flux linkage Flux* and a given torque Torque* transmitted by the speed control device module, and sends drive signal g to a traction motor inverter switching device.

A control signal output end and a given rotation speed output end of the serpentine warning and control module respectively connects with a control signal input end and a given rotation speed input end of the given speed control module. A given rotation speed output end of the given speed control module connects with the given rotation speed input end of the speed control device module, and an actual rotation speed input end of the speed control device module is connected with a rotation speed output end of the traction motor. A given flux linkage output end and a given torque output end of the speed control device module are respectively connected with a given flux linkage input end and a given torque input end of the DTC control module. The voltage and current input end of the DTC control module are respectively connected with a voltage and current output end of the traction motor measure module. A drive signal output end of the DTC control module communicates with a traction motor inverter.

Further, a display module for displaying changes in parameters of the system for suppressing the serpentine instability of the railway vehicle is further comprised.

A signal input end of the display module is respectively communicated with the speed control module, the rotation speed output end of the traction motor, and the serpentine warning and control module.

Further, the transverse acceleration measure module comprises a sensor module, a GPS module, a data collection module, a main control unit MCU module, and a data processing and analysis module.

The data collection module is respectively connected with the sensor module and the GPS module, and the main control unit MCU module is respectively connected with the data collection module and the data processing and analysis module.

Another technical solution of the present disclosure is:

A method for suppressing utilizing the above system for suppressing the serpentine instability of the railway vehicle, comprising the following steps:

Step 1: determining whether the bogie is in a state of serpentine instability;

Step 2: if the bogie is in the state of serpentine instability, giving a reference rotation speed that is lower than a current traction motor rotation speed, controlling the traction motor to reduce speed to reduce a running speed of the rail vehicle.

Further, in the step 1, the serpentine warning and control module calculates the vibration non-linear index to determine whether the bogie is in a state of serpentine instability according to the transverse vibration acceleration of the measured bogie;

The calculation of the vibration non-linear index comprises the following steps, (1) Conducting a noise-aided EEMD empirical mode decomposition of the transverse acceleration signal of a sensor at an end of the bogie to obtain multiple mode components $c_i$.

(2) Calculating an average frequency $\bar{f}_{ci}$ for every IMF, comparing one by one with a theoretical serpentine frequency $f_{ci}$, calculating $\Delta f_{ci}=|f_{ct}-\bar{f}_{ci}|\leq \varepsilon$ wherein $\varepsilon$ is an allowable error;

if $\Delta f_{ci}>\varepsilon$, then it is believed that there is no serpentine frequency component, and the high-speed rail train does not experience any serpentine instability;

otherwise, selecting the mode component $c_j$ with smallest $\Delta f_{ci}$ a serpentine characteristic wave.

(3) Calculating an instantaneous frequency IF(t) a zero-crossing average frequency $IF_{zc}(t)$, and an amplitude $A_{zc}(t)$ of the serpentine characteristic wave.

(4) Calculating the non-linear index INL of the serpentine characteristic wave $c_j$:

$$INL = \left(\frac{IF(t)-IF_{zc}(t)}{IF_{zc}(t)} \cdot \frac{A_{zc}(t)}{\bar{A}_{zc}(t)}\right)\%.$$

(5) Repeating (1) to (4) for the transverse vibration acceleration of another sensor at the other diagonal end of the bogie.

(6) If the frequencies of the serpentine characteristic waves of the transverse accelerations at the two diagonal corner ends of the bogie are consistent and the non-linear indexes of both are greater than the threshold value, then the high-speed rail train is considered as experiencing serpentine instability.

Further, in the step 2, if the bogie is in a state of serpentine instability, then the serpentine warning and control module send the control signal k and the adjusted given rotation speed sp2 to the given speed control module, and the given speed control module sends the adjusted given rotation speed sp2 to the speed control device module.

Further, the speed control device module outputs the given flux linkage Flux* to the DTC control module according to the given rotation speed sp2 through the flux linkage look-up table. The speed control device module compares the given rotation speed sp2 with the actual rotation speed of the traction motor and outputs the given torque Torque* to the DTC control module through PI regulator.

Further, the DTC control module, calculating the actual flux linkage and the actual torque according to the received current I_ab and voltage V_abc transmitted by the traction motor measure module. Taking a difference between the given flux linkage Flux* and the given torque Torque* and the actual flux linkage; differences respectively pass through the torque and the flux linkage hysteresis comparators, then input together with the flux linkage sector to the voltage switch vector table. Selecting the appropriate voltage vector and controlling the traction motor inverter switching device by sending drive signal g.

In summary, the system and method for suppressing the serpentine instability of a railway vehicle of the present disclosure has the following advantages:

1. In the present disclosure, the serpentine characteristic wave is extracted according to the transverse acceleration of the bogie, and the vibration non-linear index is calculated according to the extracted serpentine non-linear characteristic to judge whether the bogie is in a state of serpentine instability, and it controls the direct torque of the traction system through the DTC control module. The existing transverse control of the train can only reduce the transverse vibration of the train and cannot eliminate the serpentine instability. However, the present disclosure can control the traction motor to reduce the speed and eliminate the serpentine instability.

2. The present disclosure also provides a method for determining the serpentine instability to calculate the instantaneous frequency, the instantaneous amplitude and the non-linear index. The method determines whether the serpentine instability occurs according to the non-linear index, and overcomes the shortcoming that the determination method is not reliable in prior art.

DETAILED DESCRIPTION

The present disclosure is described in further detail below with reference to the accompanying drawings and the embodiments:

A system and method for suppressing serpentine instability of a railway vehicle of the present disclosure aims to eliminate the serpentine instability of the railway vehicle.

The system for suppressing serpentine instability of the railway vehicle comprises a serpentine warning and control module, a traction motor speed control system. A signal output end of the serpentine warning and control module is connected with the traction motor speed control system. The serpentine warning and control module is used to determine whether a bogie is in a state of serpentine instability, and the traction motor speed control system is used to control a rotation speed of a traction motor according to a determination from the serpentine warning and control module. If the bogie is in the state of serpentine instability, according to the determination of the serpentine warning and control module, then the rotation speed of the traction motor is controlled to reduce and the serpentine instability of the railway vehicle is effectively eliminated.

In the present embodiment, the serpentine warning and control module uses the method of calculating the vibration non-linear index to determine whether the bogie is in a state of serpentine instability, and direct control of the rotation speed of the traction motor is realized through a direct torque control (DTC) theory.

Figure 1:
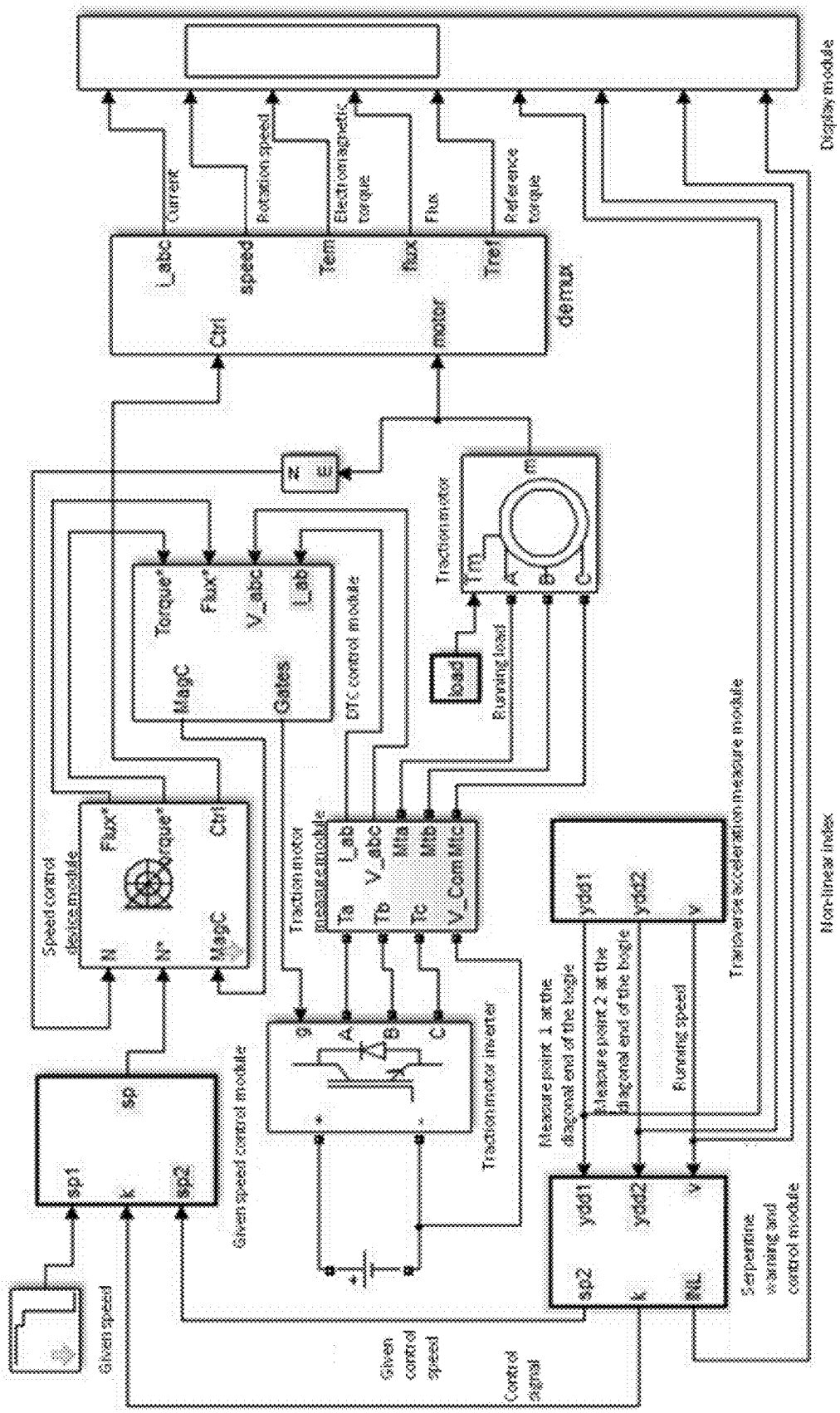
FIG. 1 is a control diagram of the direct torque of the serpentine instability of the present disclosure.

Specifically, as shown in FIG. 1, the system for suppressing serpentine instability of the railway vehicle comprises a serpentine warning and control module, a transverse acceleration measure module, a given speed control module, a speed control device module, and a DTC control module. A control signal output end and a given rotation speed output end of the serpentine warning and control module are respectively connected with a control signal input end and a given rotation speed input end of the given speed control module. A given rotation speed output end of the given speed control module is connected with the given rotation speed input end of the speed control device module, and an actual rotation speed input end of the speed control device module is connected with a rotation speed output end of the traction motor. A given flux linkage output end and a given torque output end of the speed control device module respectively communicates with a given flux linkage input end and a given torque input end of the DTC control module. The voltage and current input end of the DTC control module are respectively connected with a voltage and current output end of the traction motor measure module. A drive signal output end of the DTC control module is connected with a traction motor inverter.

Figure 2:
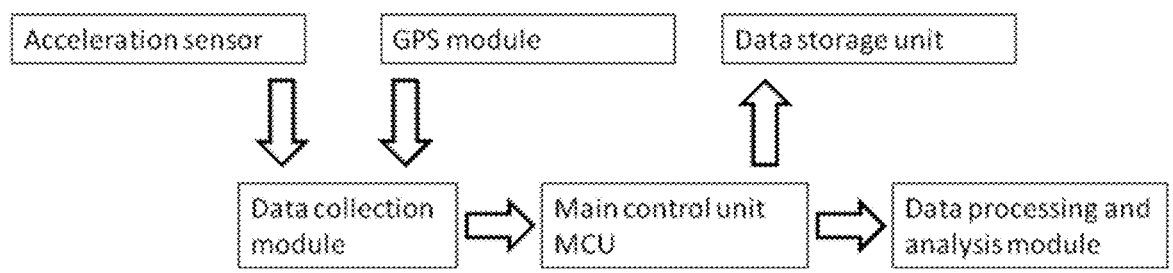
FIG. 2 is a schematic diagram of the transverse acceleration measure module of the present disclosure.

As shown in FIG. 2, the transverse acceleration measure module is used to measure the transverse vibration acceleration of the bogie, and the signal output end of the transverse acceleration measure module is connected with the signal input end of the serpentine warning and control module. The transverse acceleration measure module comprises a sensor module, a GPS module, a data collection module, a main control unit MCU module, a data processing and analysis module, and a data storage unit. The data collection module is respectively connected with the sensor module and the GPS module, and the main control unit MCU module is respectively connected with the data collection module, the data processing and analysis module, and the data storage module.

Two acceleration sensors are mounted diagonally above the spring of a bogie to measure the transverse acceleration of the bogie. The GPS module and the main control unit MCU module carry on data communication through a RS-232 serial port. Through the GPS module, it can be determined the non-linear index of a train is obtained under what speed, what position and what other conditions. The data collection module uses the A/D conversion chip to acquire the acceleration analog signal of the bogie. The data processing and analysis module is used to analyze and process serpentine instability characteristics.

The data collection module and the GPS module are packaged in a tin box and fixed in an equipment compartment under a high-speed rail train. An acceleration sensor is a strain-acceleration sensor and the sampling frequency of the sensor is set to 1000 Hz by default. The GPS test parameters are speed and position of the train, and the sampling frequency is set at 10 Hz by default.

The output ends (ydd1,ydd2) of the two measurement points of the transverse acceleration measure module are respectively connected with the two input ends of the serpentine warning and control module, and the transverse vibration accelerations ydd1 and ydd2 of the two measurement points are transmitted to the serpentine warning and control module to perform the next step calculation.

The serpentine warning and control module uses the method of calculating the vibration non-linear index to determine whether the bogie is in a state of serpentine instability, and the calculation of the vibration non-linear index comprises the following steps:

(1) Conducting a noise-aided EEMD empirical mode decomposition of the transverse acceleration signal of a sensor at an end of the bogie to obtain multiple mode components $c_i$.

(2) Calculating an average frequency $\bar{f}_{ci}$ for every IMF, comparing one by one with a theoretical serpentine frequency $f_{ci}$, calculating $\Delta f_{ci} = |f_{ci} - \bar{f}_{ci}| \leq \varepsilon$ wherein $\varepsilon$ is an allowable error;

if $\Delta f_{ci} > \varepsilon$, then it is believed that there is no serpentine frequency component, and the high-speed rail train does not experience any serpentine instability;

otherwise, selecting the mode component $c_j$ with smallest $\Delta f_{ci}$ as a serpentine characteristic wave.

(3) Calculating an instantaneous frequency IF(t) a zero-crossing average frequency $IF_{zc}(t)$, and an amplitude $A_{zc}(t)$ of the serpentine characteristic wave.

(4) Calculating the non-linear index INL of the serpentine characteristic wave $c_j$:

$$INL = \left( \frac{IF(t) - IF_{zc}(t)}{IF_{zc}(t)} \cdot \frac{A_{zc}(t)}{\bar{A}_{zc}(t)} \right)\%.$$

(5) Repeating (1) to (4) for the transverse vibration acceleration of another sensor at the other diagonal end of the bogie.

(6) If the frequencies of the serpentine characteristic waves of the transverse accelerations at the two diagonal corner ends of the bogie are consistent and the non-linear indexes of both are greater than the threshold value, then the high-speed rail train is considered as experiencing serpentine instability.

The above method for determining the serpentine instability calculates the instantaneous frequency, the instantaneous amplitude and the non-linear index; and determines whether the serpentine instability occurs according to the non-linear index. It overcomes the shortcoming that the determination method is not reliable in prior art.

A control signal output end and a given rotation speed output end of the serpentine warning and control module are respectively connected with a control signal input end and a given rotation speed input end of the given speed control module. If the bogie is in a state of serpentine instability, then the serpentine warning and control module send the control signal k and the adjusted given rotation speed sp2 to the given speed control module after the calculation in the above step.

The given speed control module is used for switching selection between the original given rotation speed sp1 and the adjusted given rotation speed sp2. If the train operates in a stable state, then the original given speed sp1 is transmitted to the speed control device module; if the train is in a state of serpentine instability, then after receiving the control signal k, the given speed control module transmits the adjusted given speed sp2 to the speed control device module as the given rotation speed N*.

The speed control device module is used to receive the given rotation speed and the actual rotation speed and transmit the given flux linkage Flux* and the given torque Torque* to the DTC control module. The speed control device module outputs the given flux linkage Flux* to the DTC control module according to the given rotation speed sp2 (the given rotation speed N*) through the flux linkage look-up table. The speed control device module compares the given rotation speed sp2 with the actual rotation speed (N) (N*−N) of the traction motor and outputs the given torque Torque* to the DTC control module through PI regulator.

The DTC control module is used to receive a current I_ab and a voltage V_abc transmitted by a traction motor measure module and a given flux linkage Flux* and a given torque Torque* transmitted by the speed control device module, and to send drive signal g to a traction motor inverter switching device.

The DTC control module is used for calculating the actual flux linkage and the actual torque according to the received current I_ab and voltage V_abc transmitted by the traction motor measure module. Taking a difference between the given flux linkage Flux* and the given torque Torque* and the actual flux linkage, differences respectively pass through the torque and the flux linkage hysteresis comparators, then input together with the flux linkage sector to the voltage switch vector table. It is also used to select the appropriate voltage vector and control the traction motor inverter switching device by sending drive signal g.

The present disclosure achieves direct control of the rotation speed of the traction motor by a direct torque control (DTC) theory. Compared with the prior art which only reduces the transverse vibration of the train, the present disclosure reduces the running speed of the train to eliminate the serpentine instability.

The present system for suppressing the serpentine instability of the railway vehicle further comprises a display module for displaying changes in parameters of the system for suppressing the serpentine instability of railway vehicle. The parameters comprise current, rotation speed, flux linkage, electromagnetic torque, reference torque, measured acceleration, non-linear index and etc. The signal input end of the display module is respectively connected with the speed control device module, the output end of the rotation speed of the traction motor, and the serpentine warning and control module.

The present disclosure also provides a method for suppressing the serpentine instability of the railway vehicle utilizing the above devices, and the method comprises the following steps:

Step 1: the serpentine warning and control module calculates the vibration non-linear index to determine whether the bogie is in a state of serpentine instability, according to the measured transverse vibration acceleration of the bogie.

Step 2: if the bogie is in a state of serpentine instability, then a reference rotation speed that is lower than a current traction motor rotation speed is given, and the traction motor is controlled to reduce its speed and the running speed of the rail vehicle is reduced.

Specifically, if the bogie is in a state of serpentine instability, then the serpentine warning and control module sends the control signal k and the adjusted given rotation speed sp2 to the given speed control module, and the given speed control module sends the adjusted given rotation speed sp2 to the speed control device module.

The speed control device module outputs the given flux linkage Flux* to the DTC control module according to the given rotation speed sp2 through the flux linkage look-up table. The speed control device module compares the given rotation speed sp2 with the actual rotation speed of the traction motor and outputs the given torque Torque* to the DTC control module through PI regulator.

The DTC control module calculates the actual flux linkage and the actual torque according to the received current I_ab and voltage V_abc transmitted by the traction motor measure module. Taking a difference between the given flux linkage Flux* and the given torque Torque* and the actual flux linkage; differences respectively pass through the torque and the flux linkage hysteresis comparators, then input together with the flux linkage sector to the voltage switch vector table. Selecting the appropriate voltage vector and controlling the traction motor inverter switching device by sending drive signal g.

As described above, a similar technical solution can be derived from the content of the technical solutions given in the drawings. However, any content that does not depart from the technical solutions of the present disclosure, any simple modifications, equivalent changes, and modifications made to the above embodiments, according to the technical essence of the present disclosure, still fall within the scope of the technical solutions of the present disclosure.

The invention claimed is:

1. A system for suppressing serpentine instability of a railway vehicle, comprising:
   a serpentine warning and control module for determining whether a bogie is in a state of serpentine instability;
   a traction motor speed control system for controlling a rotation speed of a traction motor according to a determination from the serpentine warning and control module;
   wherein, a signal output end of the serpentine warning and control module is connected with the traction motor speed control system.

2. The system for suppressing serpentine instability of the railway vehicle according to claim 1 further comprising: a transverse acceleration measure module for measuring a transverse vibration acceleration of the bogie;
   wherein, a signal output end of the transverse acceleration measure module is connected with a signal input end of the serpentine warning and control module;
   the serpentine warning and control module determines whether the bogie is in the state of serpentine instability according to data transmitted by the transverse acceleration measure module.

3. The system for suppressing serpentine instability of the railway vehicle according to claim 1, wherein, the traction motor speed control system comprises a given speed control module for selecting and transmitting an original given rotation speed sp1 or an adjusted given rotation speed sp2 to a speed control device module according to a control signal k and the adjusted given rotation speed sp2 transmitted by the serpentine warning and control module;
   the speed control device module for receiving the given rotation speed and an actual rotation speed and transmitting a given flux linkage Flux* and a given torque Torque* to a DTC control module;
   the DTC control module for receiving a current I_ab and a voltage V_abc transmitted by a traction motor measure module, and the given flux linkage Flux* and the given torque Torque* transmitted by the speed control device module, and sending a drive signal g to a traction motor inverter switching device;
   the control signal output end and a given rotation speed output end of the serpentine warning and control module respectively connects with a control signal input end and a given rotation speed input end of the given speed control module;
   a given rotation speed output end of the given speed control module connects with the given rotation speed input end of the speed control device module, and an actual rotation speed input end of the speed control device module is connected with a rotation speed output end of the traction motor;
   a given flux linkage output end and a given torque output end of the speed control device module respectively connects with a given flux linkage input end and a given torque input end of the DTC control module; a voltage input end and a current input end of the DTC control module are respectively connected with a voltage output end and a current output end of the traction motor measure module; a drive signal output end of the DTC control module connects with the traction motor inverter.

4. The system for suppressing serpentine instability of the railway vehicle according to claim 1 further comprising: a display module for displaying changes in parameters of the system for suppressing the serpentine instability of the railway vehicle;

wherein a signal input end of the display module is respectively connected with the speed control module, the rotation speed output end of the traction motor, and the serpentine warning and control module.

5. The system for suppressing serpentine instability of the railway vehicle according to claim 2, wherein, the transverse acceleration measure module comprises a sensor module, a GPS module, a data collection module, a main control unit MCU module, and a data processing and analysis module;

the data collection module is respectively connected with the sensor module and the GPS module, and the main control unit MCU module is respectively connected with the data collection module and the data processing and analysis module.

6. A method for suppressing serpentine instability of the railway vehicle according to claim 1 comprising:

step 1, determining whether the bogie is in the state of serpentine instability;

step 2, if the bogie is in the state of serpentine instability, giving a reference rotation speed that is lower than a current rotation speed of the traction motor, controlling the traction motor to reduce speed to reduce a running speed of the rail vehicle.

7. The method for suppressing the serpentine instability of the railway vehicle according to claim 6, wherein, in the step 1, the serpentine warning and control module calculates a vibration non-linear index to determine whether the bogie is in the state of serpentine instability according to the transverse vibration acceleration of the measured bogie;

a method for calculating the vibration non-linear index comprises the following steps, (1) conducting a noise-aided EEMD empirical mode decomposition of the transverse acceleration signal of a sensor at an end of the bogie to obtain multiple mode components $c_j$;

(2) calculating an average frequency $\bar{f}_{ci}$ for every IMF, comparing one by one with a theoretical serpentine frequency $f_{ci}$, calculating $\Delta f_{ci} = |f_{ci} - \bar{f}_{ci}| \leq \varepsilon$ wherein $\varepsilon$ is an allowable error;

if $\Delta f_{ci} > \varepsilon$, then it is believed that there is no serpentine frequency component, and the railway vehicle does not experience any serpentine instability;

otherwise, selecting the mode component $c_j$ with smallest $\Delta f_{ci}$ as a serpentine characteristic wave;

(3) calculating an instantaneous frequency IF(t), a zero-crossing average frequency $IF_{zc}(t)$, and an amplitude $A_{zc}(t)$ of the serpentine characteristic wave $c_j$;

(4) calculating the non-linear index INL of the serpentine characteristic wave $c_j$:

$$INL = \left( \frac{IF(t) - IF_{zc}(t)}{IF_{zc}(t)} \cdot \frac{A_{zc}(t)}{\bar{A}_{zc}(t)} \right) \%$$

(5) repeating (1) to (4) for the transverse vibration acceleration of another sensor at the other diagonal end of the bogie;

(6) if frequencies of the serpentine characteristic waves of the transverse accelerations at the two diagonal corner ends of the bogie are consistent and the non-linear indexes of both are greater than a threshold value, then the railway vehicle is determined as experiencing serpentine instability.

8. The method for suppressing the serpentine instability of the railway vehicle according to claim 7, wherein, in the step 2, if the bogie is in the state of serpentine instability, the serpentine warning and control module sends the control signal k and the adjusted given rotation speed sp2 to the given speed control module, and the given speed control module sends the adjusted given rotation speed sp2 to the speed control device module.

9. The method for suppressing the serpentine instability of the railway vehicle according to claim 8, wherein, the speed control device module outputs the given flux linkage Flux* to the DTC control module according to the given rotation speed sp2 through a flux linkage look-up table;

the speed control device module compares the given rotation speed sp2 with the actual rotation speed of the traction motor and outputs the given torque Torque* to the DTC control module through PI regulator.

10. The method for suppressing the serpentine instability of the railway vehicle according to claim 9, wherein, the DTC control module calculates an actual flux linkage and an actual torque according to current I_ab and voltage V_abc transmitted by the traction motor measure module;

taking a difference between the given flux linkage Flux* and the actual flux linkage, and the given torque Torque* and the actual torque;

differences respectively pass through the torque and a flux linkage hysteresis comparator and are entered together with a flux linkage sector to a voltage switch vector table;

selecting an appropriate voltage vector and controlling a switching device of the traction motor inverter by sending drive signal g.

* * * * *